J. M. MICHAELSON.
MECHANICAL STARTER FOR EXPLOSIVE ENGINES.
APPLICATION FILED APR. 20, 1917.
1,395,926.
Patented Nov. 1, 1921.
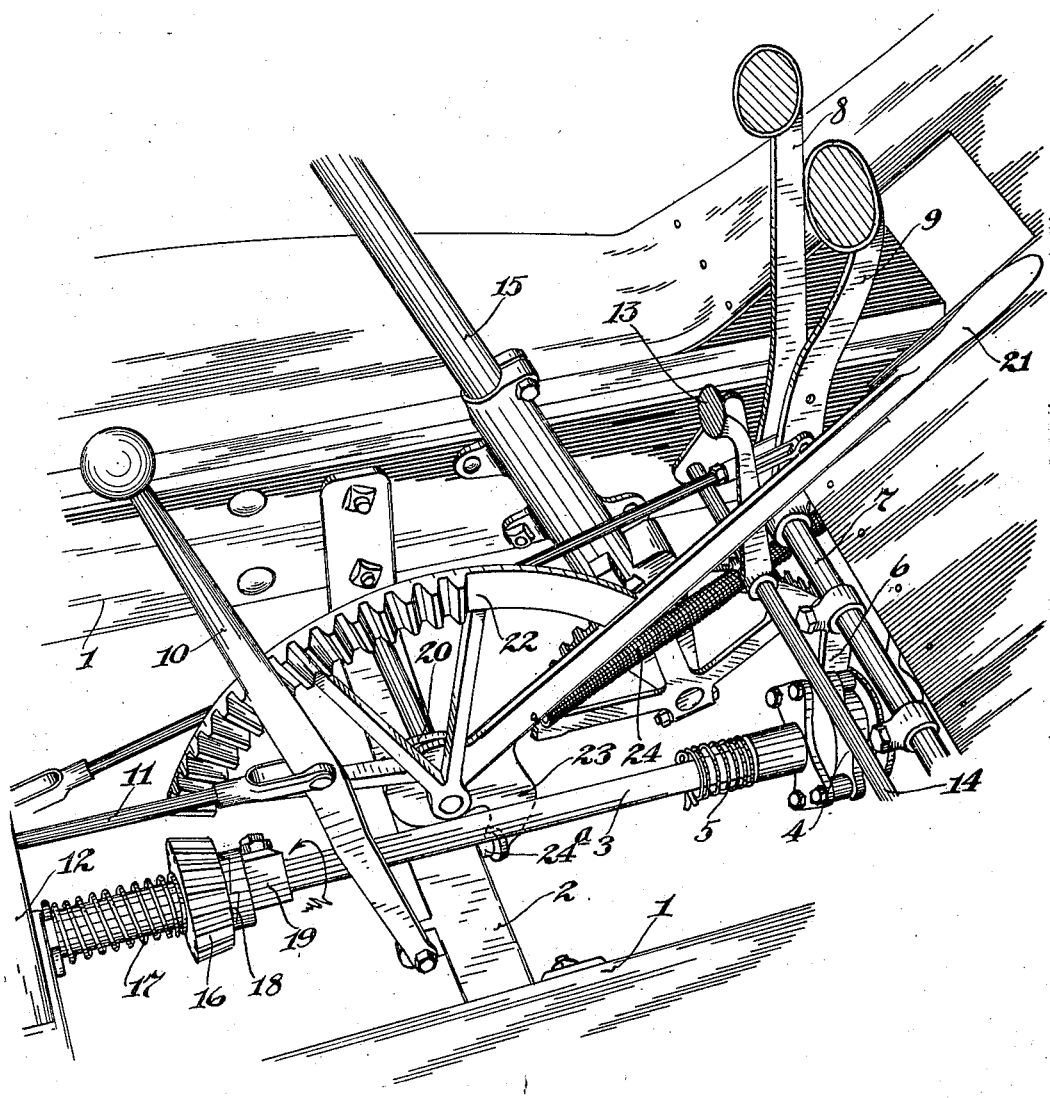
WITNESSES
E. C. Wells
H. L. Opsahl.
INVENTOR
Joseph M. Michaelson
BY HIS ATTORNEYS

UNITED STATES PATENT OFFICE.

JOSEPH M. MICHAELSON, OF MINNEAPOLIS, MINNESOTA.

MECHANICAL STARTER FOR EXPLOSIVE-ENGINES.

1,395,926.    Specification of Letters Patent.    Patented Nov. 1, 1921.

Application filed April 20, 1917. Serial No. 163,413.

*To all whom it may concern:*

Be it known that I, JOSEPH M. MICHAELSON, a citizen of the United States, residing at Minneapolis, in the county of Hennepin and State of Minnesota, have invented certain new and useful Improvements in Mechanical Starters for Explosive-Engines; and I do hereby declare the following to be a full, clear, and exact description of the invention, such as will enable others skilled in the art to which it appertains to make and use the same.

My invention has for its object the provision of an extremely simple and highly efficient mechanical "starter" for automobile engines; and to such ends, the invention consists of the novel devices and combinations of devices hereinafter described and defined in the claim.

This improved starter is designed for application to an automobile or motor-propelled vehicle in which the transmission or shift gears are remote from the engine, so that the starter may operate on that portion of the transmission shaft that is between the clutch and the transmission gears.

The invention is illustrated in the accompanying drawing which is a perspective view showing part of an automobile.

Of the parts of the automobile, the numeral 1 indicates the framework and the numeral 2 the cross bar thereof. The numeral 3 indicates the transmission shaft which is driven from the engine, in the usual way, through a friction clutch 4, normally set by a spring 5, and adapted to be released by a clutch lever 6, on a rock shaft 7 having an arm 8 connected to a movable clutch member in the well known way. The numeral 9 indicates a brake lever pivoted on the rock shaft 7, and having the usual brake connections. The shift lever 10 is shown as pivoted to the cross bar 2 and provided with a shift rod 11 extended to the transmission or shift gear mechanism and operating the same in well known manner. The shift gears, *per se*, form no part of this invention and may be of well known construction. The case 12 of this shift gear mechanism, only, is shown in the drawing. The numeral 13 indicates an accelerator lever on a rock shaft 14. The numeral 15 indicates the steering post applied and operated in the usual way.

The improved starter will now be described: It comprises a bevel pinion 16 mounted to rotate and slide on the transmission shaft 3, in front of the case 12. This pinion is yieldingly pressed forward by a coiled spring 17, and it is provided with a half clutch 18 normally engaged with a half clutch 19 rigidly secured on shaft 3.

Journaled to the cross bar 2 is a transverse rock shaft 20, to the inner end of which a starter lever 21 is secured. This lever 21 has a rigidly secured bevel gear segment 22 and stop arm 23, the latter having preferably a pliable buffer 24ª for direct engagement with front edge of the cross bar 2.

A spring 24 attached to lever 21 and anchored to the frame 1, at its front end, yieldingly holds said lever 21 and segment 22 forward, and in normal position shown in the drawing.

The gear segment 22 is so located that under downward movement, it will engage pinion 16 and rotate the same. Hence, when the starting member 21 is thrown rearward, gear 22 will rotate pinion 16 and the latter, through the coöperating half clutches 18 and 19, will positively rotate transmission shaft 3, in proper direction to start the engine. When the engine starts, the clutch members 18 and 19 will permit the same to run ahead of the pinion 16, while lever 21 and gear 22 are being moved back to normal position shown in the drawing. With the type of clutch illustrated, there will, of course be a slight clicking while the starting lever and gear segment are being restored to normal position, but this clicking will be eliminated by the use of a friction one-way clutch, or pawl and ratchet device. Obviously, when the starting lever is in a normal position, the pinion 16 will freely rotate with the transmission shaft.

This improved starting device is of small cost and has, in practice, been found highly efficient for the purposes had in view.

A simple rearward movement of the starting lever serves to start the engine, and this movement does not require any great power, and this is especially so in the starter when used in connection with an engine having small cylinders. Particularly, this starter is adapted for use in connection with small automobiles, the engines of which have cylinders of small bore. The segmental gear of the starting lever is preferably made of such circumferential extent that it will give the pinion, and consequently the transmission shaft and engine crank shaft about one and one-half rotations for each complete rearward movement of the starting lever. Obviously, when the engine is once started, the operator can let go of the starting lever, allowing the spring to restore it to its normal forwardly extended position.

What I claim is:

In a motor propelled vehicle having side frame members and an intermediate cross member connecting the same, a transmission shaft and a clutch for connecting the same to the motor, an engine starter comprising a beveled pinion on said transmission shaft connected thereto by a one-way clutch arranged to cause said pinion to drive said shaft but permitting said shaft to run ahead of said pinion, a flat gear segment disposed in a plane parallel to the transmission shaft having lateral teeth thereon and located forwardly of said pinion and above the same, a hand lever extending forwardly from said segment and forming the forward radial arm thereof, said segment being pivotally mounted on a short shaft on said cross member of the frame, one edge of said cross member serving as a stop member, a bracket having a buffer thereon carried by said lever and adapted to contact with said stop member, and a spring tending to maintain said lever in its forward position.

In testimony whereof I affix my signature in presence of two witnesses.

JOSEPH M. MICHAELSON.

Witnesses:
  BERNICE G. WHEELER,
  HARRY D. KILGORE.